United States Patent [19]

Sato

[11] Patent Number: 5,204,709
[45] Date of Patent: Apr. 20, 1993

[54] CAMERA APPARATUS HAVING FUNCTION FOR CHANGING CONDITION OF RELEASE OPERATION

[75] Inventor: Tatsuya Sato, Hachioji, Japan

[73] Assignee: Olympus Optical Co., Ltd., Tokyo, Japan

[21] Appl. No.: 753,917

[22] Filed: Sep. 3, 1991

[30] Foreign Application Priority Data

Sep. 17, 1990 [JP] Japan .................................. 2-243863
Sep. 17, 1990 [JP] Japan .................................. 2-246439

[51] Int. Cl.$^5$ ............................................. G03B 17/38
[52] U.S. Cl. ................................................... 354/266
[58] Field of Search ....................... 354/266, 267.1, 268

[56] References Cited

FOREIGN PATENT DOCUMENTS 54-33030  3/1979  Japan .
54-53529  4/1979  Japan .
58-37056  8/1983  Japan .
62-112143 5/1987  Japan .

Primary Examiner—W. B. Perkey
Attorney, Agent, or Firm—Frishauf, Holtz, Goodman & Woodward

[57] ABSTRACT

A control apparatus for a camera according to this invention causes a camera main body to start a photographing operation when a first signal is output by an operation of a release operating member. When proper photographing conditions cannot be obtained, e.g., in an out-of-focus or low-luminance state or during a camera shake, the control apparatus does not cause the camera main body to start the photographing operation until a second signal is output by an operation of the release operating member. The control apparatus for a camera of this invention compares an electrical signal corresponding to an operation of the release operating member with a determination level corresponding to an operation timing of the camera main body, thereby determining a shutter release timing. The determination level can be changed in accordance with at least one of a luminance of an object to be photographed, a focal length of a photographic lens, and a photographing mode of the camera main body.

34 Claims, 13 Drawing Sheets

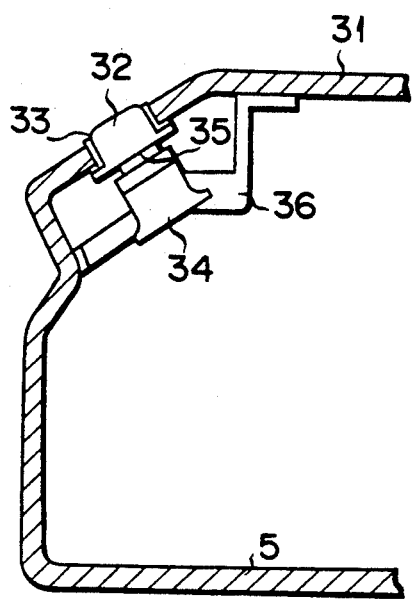
F I G. 5
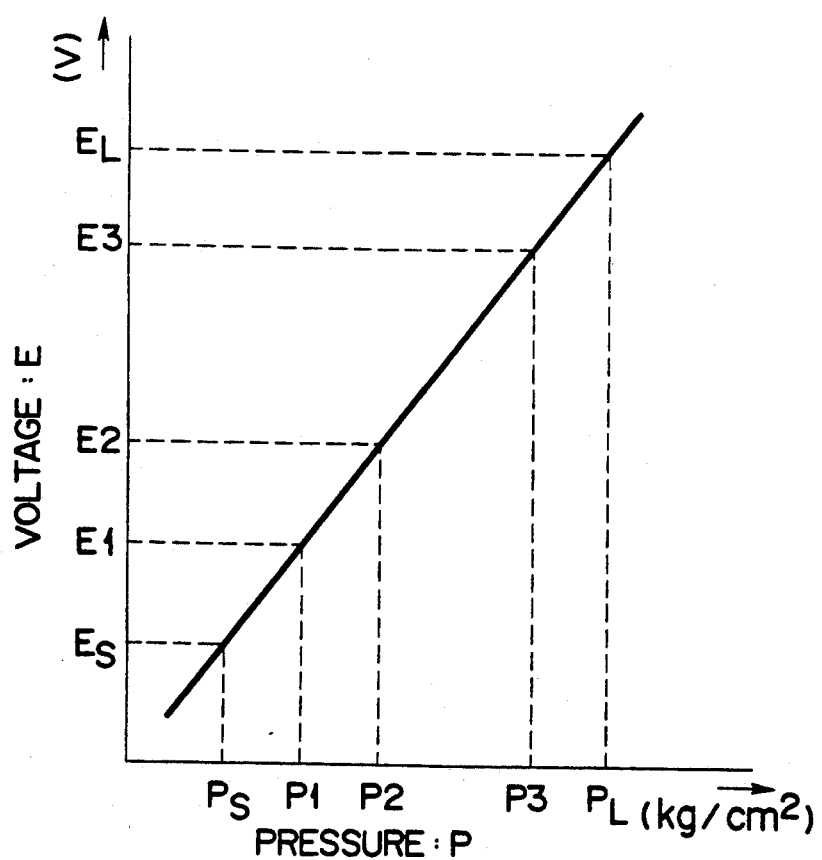
F I G. 6A

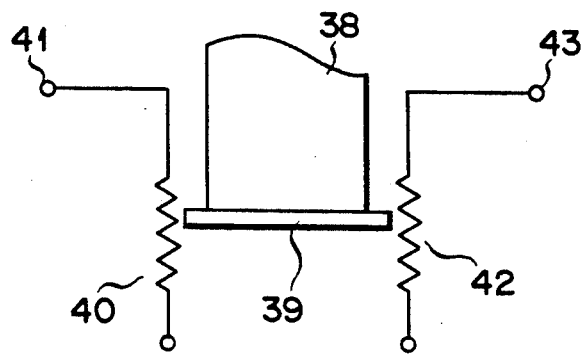
F I G. 8
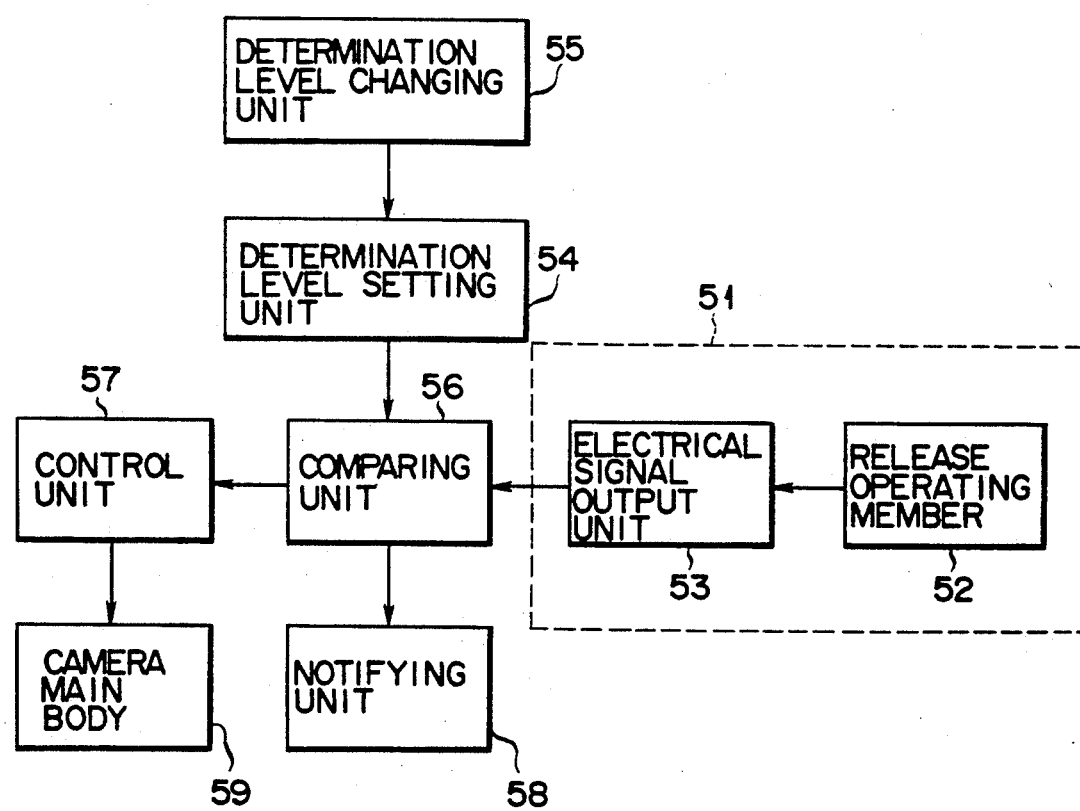
F I G. 9

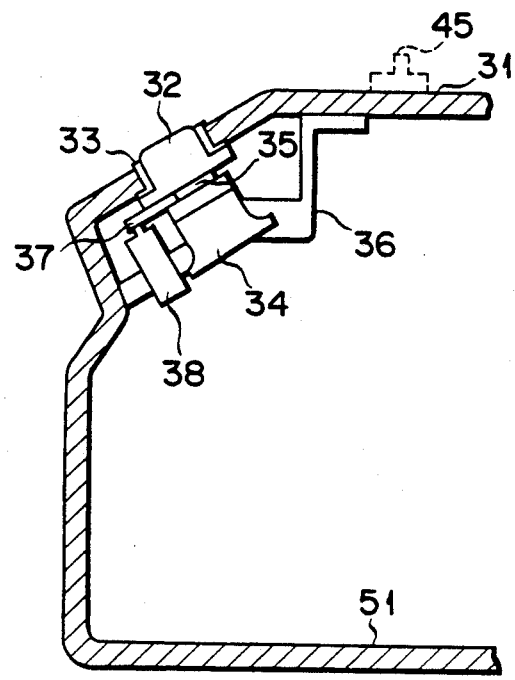
F I G. 11
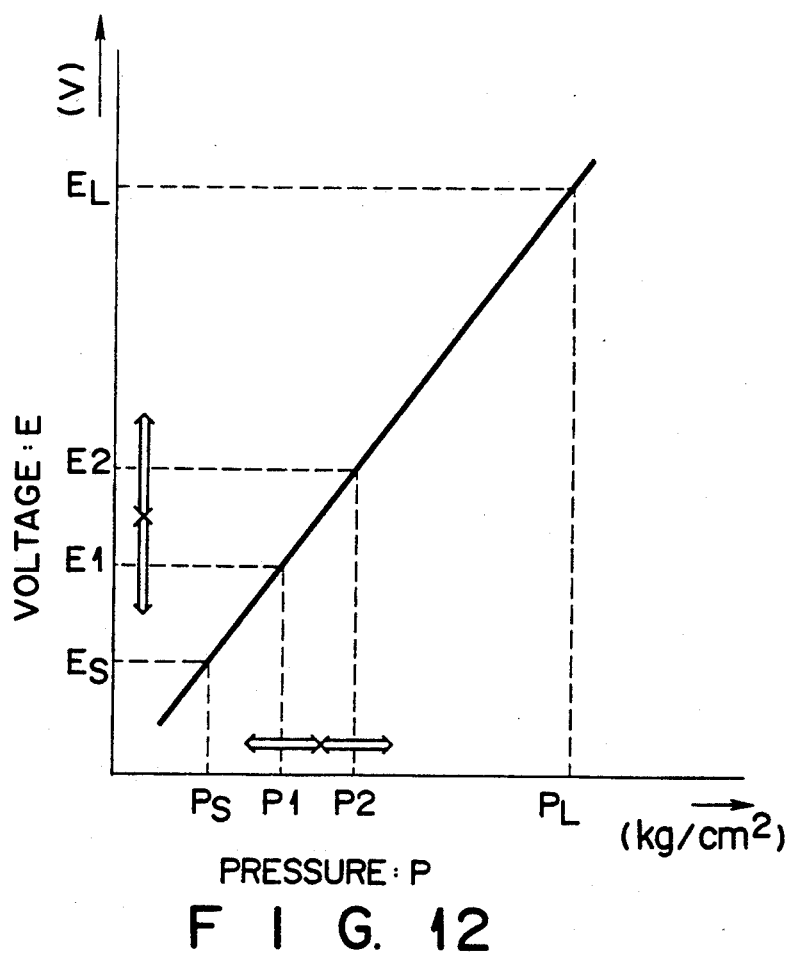
F I G. 12

CAMERA APPARATUS HAVING FUNCTION FOR CHANGING CONDITION OF RELEASE OPERATION

BACKGROUND OF THE INVENTION

1. Field of the Invention

The present invention generally relates to a camera apparatus and, more particularly, to a camera apparatus having a control function for releasing a limitation in release operation in accordance with the will of a photographer even when proper photographing cannot be performed depending on photographing conditions, or for changing a shutter release timing in accordance with the taste or skill of a photographer in order to reduce a camera shake which is a problem in photographing.

2. Description of the Related Art

Recently, since a camera has various automatic functions such as an automatic exposure function and an automatic focusing function, a photographer can take a proper picture in almost any case by simply depressing a release button. Since such an automatized camera gives priority to taking a proper picture, if no proper photographing conditions can be obtained, the camera inhibits a release operation or alarms a photographer with illumination of a light-emitting diode or sound, thereby informing the photographer that a change in photographing conditions, manual focus adjustment, or the use of an electronic flash is required.

One cause of degrading the quality of a picture is a phenomenon called "camera shake". One proposed camera delays or inhibits a release operation, if this camera shake is large, until the camera shake reaches its peak value or becomes small.

However, when the release operation is delayed or inhibited in a camera as described above, a release time lag is extremely prolonged to sometimes miss a spontaneous shutter chance. In such a case, a photographer is forced to change photographing conditions, manually performs focus adjustment, uses an electronic flash (waits for charge completion), ensures holding of the camera, or fixes the camera by a tripod.

In order to prevent the above inconveniences, there is a camera by which a photographer can select, by a button operation, a mode in which a release operation is neither delayed nor inhibited. Although this camera can perform real-time photographing, it performs photographing by a normal release feeling even if there is a factor having a large influence on a picture, such as underexposure, an out-of-focus state, and a large camera shake. For this reason, a photographer may not notice that a taken picture is an improper one or must ignore an alarming light-emitting diode or the like turned on in a finder. In addition, a camera of this type requires a button operation or the like for mode selection, and this operation is time-consuming.

A release operation of a camera is largely affected by various factors such as the shape, the stroke, and the depression force of a release button. This release operation is assumed to be one factor of causing a camera shake in photographing by a camera, and in order to reduce the camera shake, the stroke is extremely shortened or the depression force is reduced in conventional methods.

In order to reduce the camera shake, various types of cameras have been proposed. Examples are a camera in which a release operation is activated when a user releases his or her finger from a portion corresponding to a release button, a camera in which a release operation is activated when an intentional wink of a user is detected, and a camera having two or more release buttons in its upper and lower portions so that a force applied on the camera is uniformly distributed with a good balance because a user must depress the two or more buttons, thereby reducing the camera shake.

Published Unexamined Japanese Patent Application No. 54-33030 discloses a camera which shortens the stroke by using a pressure-sensitive semiconductor device, thereby preventing the camera shake. In addition, Published Examined Japanese Utility Model Application No. 58-37056 discloses a camera in which release button units having different depression forces and strokes of a release and different photographing operation timings can be selected.

In conventional release button structures, however, although the shape, the stroke, and the depression force of the release button are different between the respective types of cameras, they are almost predetermined in individual cameras. That is, although the stroke may be extremely shortened, the depression force may be reduced, or the release button unit may be exchanged, in order to reduce the camera shake, these conditions are predetermined in individual cameras.

In current camera apparatuses, however, the use of a zoom lens which covers focal length: f=100 [mm] to 150 [mm] is generally considered, an influence of an image shake caused by the camera shake must be taken into consideration more seriously. However, the release conditions (the shape, the stroke, and the depression force) which are assumed as one cause of the camera shake are not determined by taking the photographing level (skill) of each user into consideration but is unconditionally provided to users by manufacturers.

In addition, as described above, although the camera shake can be prevented by shortening the stroke or reducing the depression force, an inconvenience of causing an erroneous release operation (erroneous photographing) caused by an erroneous operation is increased to lead to waste of a film. More specifically, since a timing at which a first release switch is turned on is set close to a timing at which a second release switch is turned on, a user turns on both the first and second release switches although he or she intends to turn on only the first one.

Furthermore, in conventional cameras, the timings at which the first and second release switches are turned on cannot be independently adjusted.

SUMMARY OF THE INVENTION

It is, therefore, an object of the present invention to provide a new and improved camera control apparatus for changing conditions of the release operation, which normally limits the release operation to prevent photographing of an improper picture while allowing a user to perform the release operation so as not to miss a shutter chance.

It is, therefore, another object of the present invention to provide a new and improved camera control apparatus for changing conditions of the release operation, which can determine an operation timing of the shutter release operation in accordance with the taste or skill of a photographer and the photographing conditions.

According to one aspect of the present invention, there is provided a control apparatus for a camera, comprising a release operating member to be depressed by a predetermined amount, for causing a camera main body to perform a photographing operation, signal generating means for generating a photographing ready signal when the release operating member is depressed by a first amount, a first photographing start signal when the release operating member is depressed up to a second amount exceeding the first amount, and a second photographing start signal when the release operating member is depressed up to a third amount exceeding the second amount, measuring means including at least one of a photometering circuit and a distance measuring circuit for measuring a luminance of and a distance to an object to the photographed upon receiving the photographing ready signal from the signal generating means, control means for enabling the first photographing start signal from the signal generating means in at least one of a case where the luminance of said object which is measured by said measuring means exceeds a predetermined value and a case where said camera is focusable on said object, and for disabling the first photographing start signal and enabling the second photographing start signal from the signal generating means at least one of a case where the luminance of said object is less than or equal to the predetermined value and a case where said camera is not focusable on said object where said camera is not focusable on said object and exposing means for operating upon receiving one of the first and second photographing start signals enabled by the control means.

According to another aspect of the present invention, there is provided a control apparatus for a camera, comprising a release operating member to be depressed, for causing a camera main body to perform a photographing operation, signal output means for generating an electrical signal in accordance with a depression force on the release operating member, first release voltage generating means for outputting a first predetermined voltage level, second release voltage generating means for outputting a second voltage level different from the first voltage level, comparing means for sequentially comparing an output from the signal output means with outputs from the first and second release voltage generating means in accordance with the depression of the release operating member control means including at least one of a distance measuring circuit and a photometering circuit for measuring a distance to and a luminance of an object to be photographed and a shutter operating circuit for operating a shutter, each circuit sequentially operating upon receiving an output from the comparing means, and changing means for changing an the output from the second release voltage generating means in accordance with photographing conditions of the object.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a longitudinal sectional side view showing another example of the release operating unit;

FIG. 6A is a graph showing the pressure-voltage conversion characteristic of a pressure-voltage converting unit;

FIG. 8 is a view showing a main part of FIG. 7;

FIG. 9 is a block diagram showing a camera according to the second embodiment of the present invention;

FIG. 11 is a longitudinal sectional side view showing an arrangement in which a locking member is added to the release operating unit shown in FIG. 3;

FIGS. 12 and 13 are graphs each showing the pressure-voltage characteristic of a pressure-voltage converting unit used in the second embodiment;

DETAILED DESCRIPTION OF THE PREFERRED EMBODIMENTS

Figure 1:
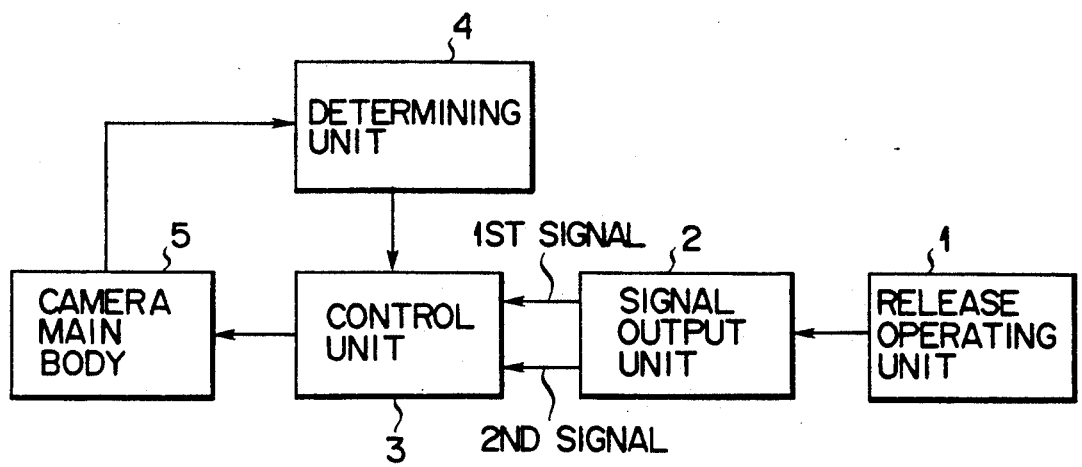
FIG. 1 is a block diagram showing a camera according to the first embodiment of the present invention.

Reference will now be made in detail to the presently preferred embodiments of the invention as illustrated in the accompanying drawings, in which like reference characters designate like or corresponding parts throughout the several drawings.

The first embodiment of the present invention will be described below with reference to the accompanying drawings.

FIG. 1 is a block diagram showing a camera control apparatus according to the first embodiment of the present invention. That is, a signal output unit 2 outputs a first signal when an operation amount or an operation force of a release operating member 1 reaches a first predetermined value and a second signal when it reaches a second predetermined value. A determining unit 4 determines whether proper photographing conditions can be obtained in accordance with information such as a focusing state, the luminance of an object to be photographed, and a camera shake amount supplied from a camera main body 5. If no proper conditions can be obtained, the determining unit 4 outputs a signal to a control unit 3. The control unit 3 receives the first and second signals from the signal output unit 2 and the signal from the determining unit 4, and normally controls the camera main body 5 to start a photographing operation in response to the first signal. Upon receiving the signal from the determining unit 4, however, the control unit 3 switches a photographing start timing from the first to second signal and then controls the camera.

Figure 2:
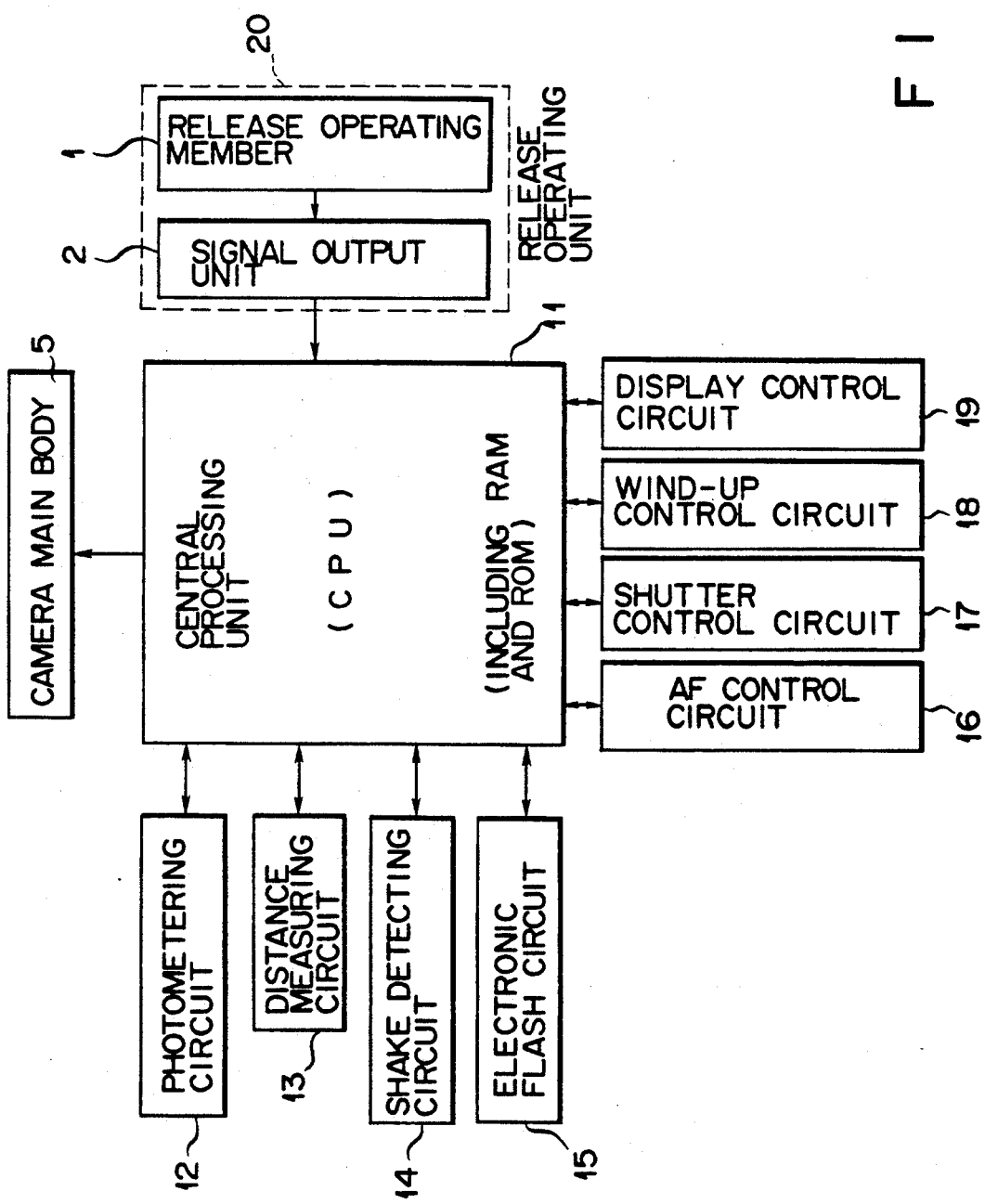
FIG. 2 is a block diagram showing an arrangement of the camera according to the first embodiment of the present invention.

FIG. 2 is a block diagram showing an arrangement of the camera according to the first embodiment of the present invention. That is, the camera main body 5 is controlled by a central processing unit (CPU) 11 incorporating memory elements (a RAM and a ROM) as the control unit 3. A photometering circuit 12, a distance measuring circuit 13, a shake detecting circuit 14, and an electronic flash circuit 15 are well-known circuits and respectively supply the luminance of an object to be photographed, a distance to the object, a camera shake amount, and an electronic flash charge amount to the CPU 11. An auto-focus (AF) control circuit 16, a wind-up control circuit 18, and a display control circuit 19 are also well-known circuits and respectively perform driving or aperture control of a photographic lens, driving of a shutter, feeding of a film, and alarm display in the camera main body 5. The CPU is also connected to a release operating unit 20 constituted by the release operating member 1 and the signal output unit 2.

Figure 3:
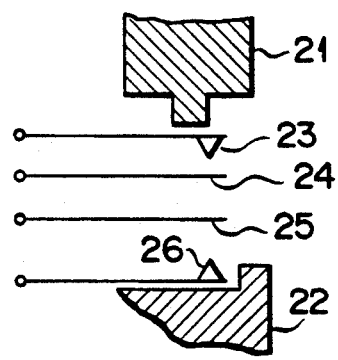
FIG. 3 is a schematic view showing an arrangement of a release operating unit used in FIG. 2.

The release operating unit 20 is arranged, e.g., as shown in FIG. 3. That is, a release button 21 is slidably held by a predetermined portion of the camera main body 5 as is well known, and a fixed receiving portion 22 is formed in a position corresponding to the release button 21. A common contact 23, a contact 24 for constituting a first release switch, a contact 25 for constituting a second release switch, and a contact 26 for constituting a third release switch are arranged between the release button 21 and the fixed receiving portion 22. When the release button 21 is depressed, therefore, the first release switch (contact 24) is turned on, and then the second release switch (contact 25) is turned on. When the release button 21 is further depressed, the third release switch (contact 26) is turned on at a position where the release button 21 abuts against the fixed receiving portion 22 which forms a stopper.

Figure 4:
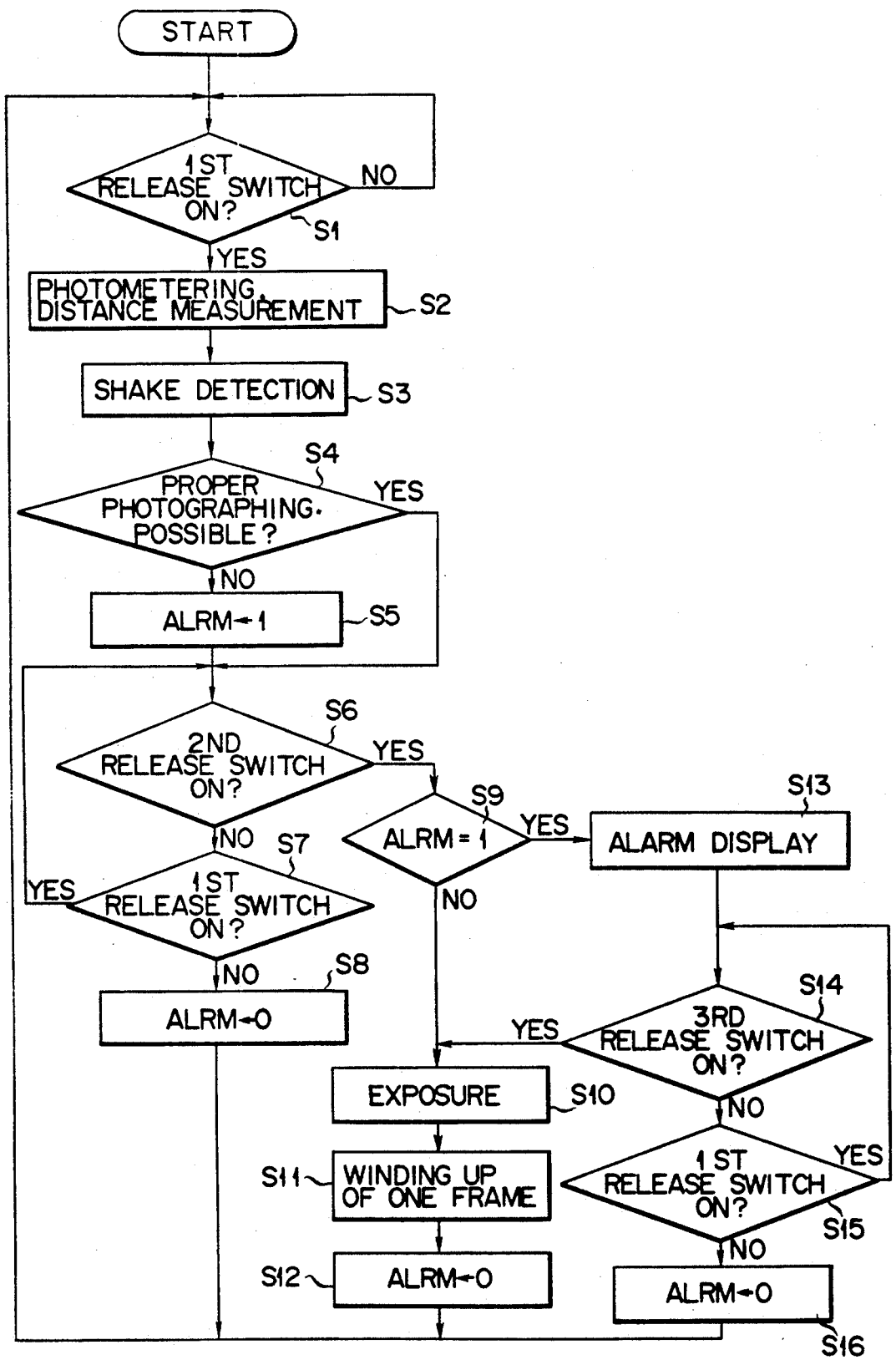
FIG. 4 is a flow chart for explaining an operation of the camera according to the first embodiment of the present invention.

An operation of the camera using the above release operating unit 20 will be described below with reference to a flow chart shown in FIG. 4. First, upon detecting that the first release switch (contact 24) is turned on (step S1), the CPU 11 causes the photometering circuit 12, the distance measuring circuit 13, and the shake detecting circuit 14 to perform a photometering operation, a distance measuring operation, and detection of a shake amount, and checks whether proper photographing can be performed (steps S2 to S4). If the CPU 11 determines in accordance with the results of photometering, distance measurement, and shake amount detection that no proper photographing can be performed, it sets an alarm flag ALRM to be "1" (step S5). Subsequently, the CPU 11 detects whether the second release switch (contact 25) is turned on (step S6). If the second release switch is OFF, the CPU 11 detects the state of the first release switch (contact 24) again (step S7). If the first release switch is OFF, too, the CPU 11 sets the alarm flag ALRM to be "0" and returns to the initial state (step S8).

If the first release switch (contact 24) is ON in step S7, the CPU 11 returns to step S6 to detect the state of the second release switch (contact 25). If the second release switch is turned on, the CPU 11 checks the alarm flag ALRM (step S9). If the alarm flag ALRM is not "1", the CPU 11 performs exposure (step S10) and winding up of one frame (step S11), sets the alarm flag ALRM to be "0", and returns to the initial state (step S12).

If the alarm flag ALRM is "1" in step S9, the CPU 11 performs alarm display (step S13) and detects the state of the third release switch (contact 26) (step S14). If the third release switch is turned on, the CPU performs exposure (step S10) and winding up of one frame (step S11), sets the alarm flag ALRM to be "0", and returns to the initial state (step S12). If the third release switch (contact 26) is OFF in step S14, the CPU 11 detects the state of the first release switch (contact 24) (step S15). If the first release switch is OFF, the CPU 11 sets the alarm flag ALRM to be "0" and returns to the initial state (step S16). If the first release switch (contact 24) is ON in step S15, the CPU returns to step S14 to check the state of the third release switch again.

In the first embodiment as described above, in a normal photographing state, the first signal is output to start exposure (photographing) when the second release switch (contact 25) is turned on. When no proper photographing can be obtained, the release button 21 is further depressed to turn on the third release switch (contact 26), thereby outputting the second signal to start exposure (photographing).

Another example of the release operating unit 20 will be described below with reference to FIG. 5. Referring to FIG. 5, reference numeral 31 denotes an outer wall of the camera main body 5; 32, a release button; 33, a release button receiver; 34, a pressure-voltage converting unit having a pressure-voltage converting function such as a pressure sensor, pressure-sensitive conductive rubber, or a pressure distribution sensor; 35, a connecting member for connecting the release button 32 with the pressure-voltage converting unit 34; and 36, a supporting member for supporting the pressure-voltage converting unit 34 integrally on the outer wall 31 of the camera main body.

A function of the arrangement shown in FIG. 5 will be described below. When the release button 32 is depressed, a pressure is applied on the upper portion of the pressure-voltage converting unit 34 via the connecting member 35, and the pressure-voltage converting means 34 generates a voltage accordingly. By the above function, when the release button 32 is depressed, a voltage corresponding to the depression pressure can be obtained.

Figure 6B:
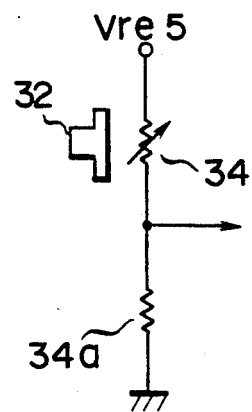
FIG. 6B is a view showing an arrangement for obtaining an output of the pressure-voltage converting unit.

The above function will be described below with reference to a graph shown in FIG. 6A. FIG. 6A is a graph showing an example of the pressure-voltage characteristic of the pressure-voltage converting unit 34, in which reference symbol E represents an output from the pressure-voltage converting unit 34; and P, a pressure applied on the release button 32. For example, this output E is obtained as a contact voltage between the pressure-sensitive conductive rubber 34 and a fixed resistor 34a, as shown in FIG. 6B. Although a relationship between the pressure P and the voltage E is almost proportional, this relationship need not be proportional but may be a quadratic function. In addition, although the P-E characteristic is a linear function having a positive gradient in FIG. 6A, it may be a linear function having a negative gradient. That is, the pressure P and the voltage E need only have a one-to-one relationship. In this graph, a voltage corresponding to a pressure $P_1$ [kg/cm$^2$], for example, is $E_1$ [V].

In this graph, $E_S$ and $E_L$ represent the minimum and maximum voltages, respectively, at which the output from the pressure-voltage converting unit 34 can be determined; $E_1$, a voltage level at which commands such as photometering, distance measurement, and shake amount detection are output from the CPU 1; $E_2$, a voltage level at which the first signal is output from the CPU 11; and $E_3$, a voltage level at which the second signal is output from the CPU 11. These voltage levels $E_1$, $E_2$, and $E_3$ correspond to the first release switch (contact 24), the second release switch (contact 25), and the third release switch (contact 26), respectively.

Figure 7:
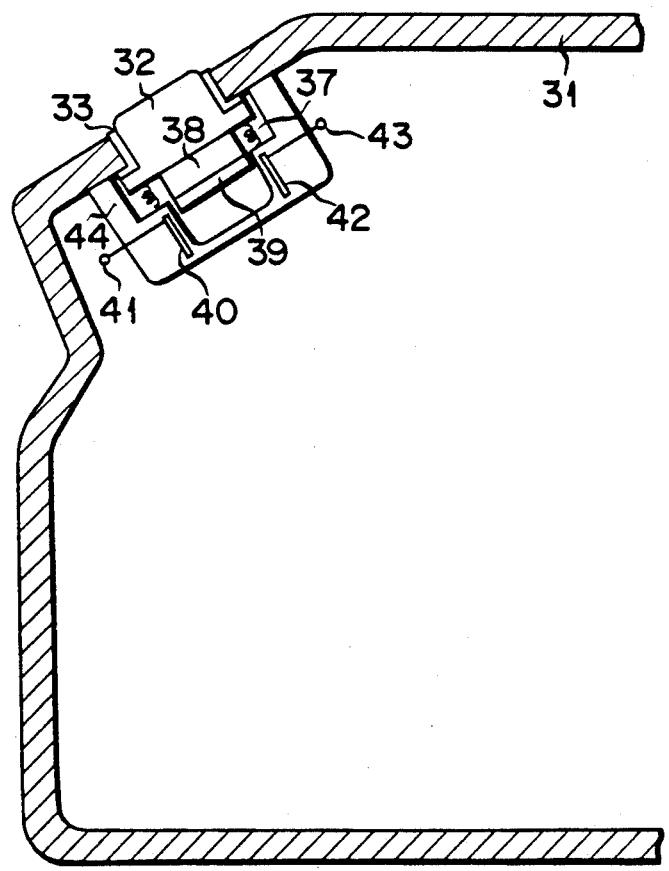
FIG. 7 is a longitudinal sectional side view showing still another example of the release operating unit.

Still another example of the release operating unit 20 will be described below with reference to FIG. 7. Referring to FIG. 7, reference numeral 31 denotes an outer wall of a camera main body; 32, a release button; and 33, a release button receiver. These members are the same as those shown in FIG. 5. Reference numeral 37 denotes a release button spring for urging the release button 32 upward; 38, a stroke limiting member for determining the stroke of the release button 32; 39, a conducting member fixed to the stroke limiting member 38 and brought into slidable contact with a resistor unit (to be described later) to conduct it; 40, a first resistor connected to a terminal 41 to form the resistor unit; 42, a second resistor connected to a terminal 43 to similarly form the resistor unit; and 44, a fixing member for fixing the release button spring 37 and the first and second resistors 40 and 42.

The function of the arrangement shown in FIG. 7 will be described below with reference to FIG. 8. FIG. 8 shows a main part of the arrangement shown in FIG. 7. When the release button 32 is depressed, the stroke limiting member 38 and the conducting member 39 fixed to the release button 32 move within the respective moving ranges. The first and second resistors 40 and 42 in contact with the two ends of the conducting member 39 allow a line from the terminal 41 to the terminal 43 to serve as a line having a certain resistance, and the position of the conducting member 39 changes in accordance with the depression of the release button 32. Therefore, assuming that the resistance between the terminals 41 and 43 is $R_{AB}$, this value naturally changes in accordance with the depression of the release button 32. Therefore, since a voltage value corresponding to the depression of the release button 32 can be extracted by flowing a predetermined current between the terminals 41 and 43, an operation similar to that performed when the pressure-voltage converting unit 34 is used in the release operating unit 20 can be obtained.

In the arrangement shown in FIG. 7, the second resistor 42 may be omitted, and the stroke limiting member 38 may be formed as a conductive member. In this case, the terminal 43 is connected to the stroke limiting member 38 to form a signal line via the release button spring 37. As a result, the arrangement can be simplified because the contact portions are united.

According to the first embodiment of the present invention as described above in detail, a user can check by the feeling of a finger depressing the release button whether proper photographing can be performed. In addition, even when no proper photographing can be performed, a user can take pictures by applying a depression force slightly larger than a normal depression force if he or she wants to take a picture immediately. Therefore, a user can perform both the release operation and the proper photographing operation without executing the switching operation using the operating member between the two operations unlike in conventional cameras. As a result, a user can perform photographing in accordance with the photographing conditions at that time without missing a spontaneous shutter chance.

The second embodiment of the present invention will be described below with reference to the accompanying drawings.

FIG. 9 is a block diagram showing a camera according to the second embodiment of the present invention. Reference numeral 51 denotes a release operating unit constituted by a release operating member 52 such as a release button and an electrical signal output unit 53, associated with an operation of the release operating member 52, for outputting an electrical signal corresponding to the operation; 54, a determination level setting unit for storing a plurality of determination levels (voltage values) for determining operation timings required for the respective operations of a camera main body 59; 55, a determination level changing unit for changing the voltage values of the determination level setting unit 54 in accordance with photographing conditions; 56, a comparing unit for comparing a voltage generated by the release operating unit 51 with the voltage values stored in the determination level setting unit 54; 57, a control unit for controlling the operations of the camera main body 59 upon receiving the comparison results from the comparing unit 56; 58, a notifying unit for notifying the comparison results of the comparing unit 56.

The function of the arrangement shown in FIG. 9 will be briefly described below. The comparing unit 56 compares the voltage generated by the release operating unit 51 in correspondence with the release operation with the voltages values corresponding to the respective operations and stored in the determination level setting unit 54 and determines in accordance with the comparison result whether the respective operations (e.g., photometering, distance measurement, and photographing) of the camera main body 59 are to be performed. The comparing unit 56 sends the determination signal to the camera main body 59 via the control unit 57 and causes the notifying unit 58 to notify a photographer of this information. The voltage values corresponding to the respective operations and stored in the determination level setting unit 54 are changed by the determination level changing unit 55 in accordance with the photographing conditions at that time.

Figure 10:
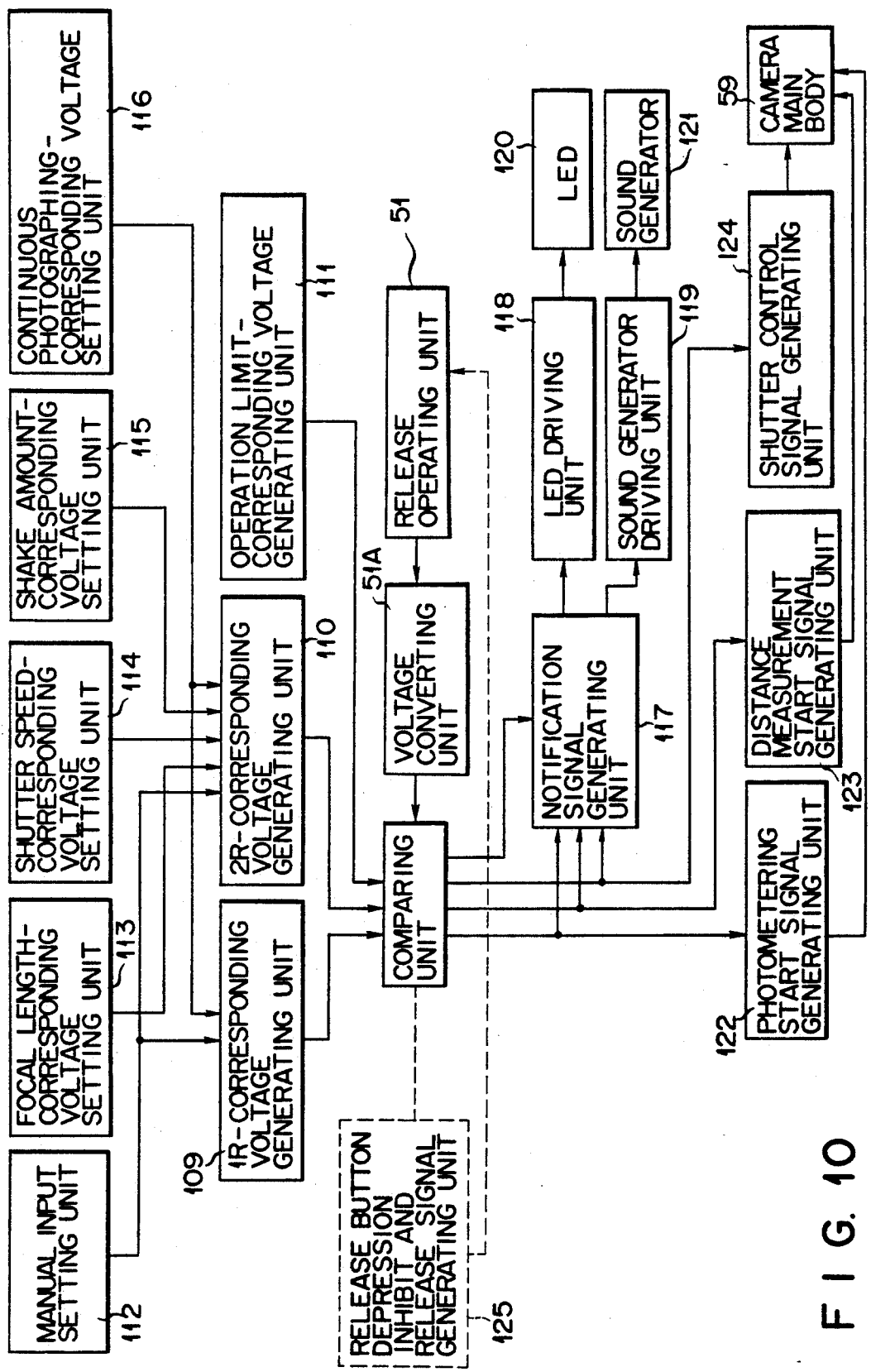
FIG. 10 is a block diagram showing an arrangement of the camera according to the second embodiment of the present invention.

FIG. 10 is a block diagram showing the arrangement of the camera according to the second embodiment of the present invention. Reference numeral 51 denotes a release operating unit 51 for generating an electrical signal corresponding to the operation (pressure) of the release; 51A, a voltage converting unit for converting the electrical signal from the release operating unit 51 into a corresponding voltage; and 56, a comparing unit for comparing the voltage generated by the release operating unit 51 with voltage values corresponding to operation timings required for the respective operations of the camera main body 59. The comparing unit 56 receives the voltage corresponding to the operation of the release as described above and the voltage values corresponding to the operation timings of the respective operations of the camera main body 59. An example of generating this voltage value will be described below.

That is, reference numeral 109 denotes a 1R-corresponding voltage generating unit corresponding to the first release (to be referred to as 1R hereinafter) of the camera, for defining the start timings of the photometering operation and the distance measuring operation; 110, a 2R-corresponding voltage generating unit corresponding to the second release (to be referred to as 2R hereinafter) of the camera, for defining mirror up for starting photographing, start of shutter front curtain running, and start of shutter blade operation; and 111, an operation limit-corresponding voltage generating unit for defining a breakdown voltage limit upon pressure-voltage conversion.

As described above, the respective corresponding voltage generating units 109 to 111 generate voltage values corresponding to the operation timings required for the respective operations of the camera main body 59. The 1R-corresponding voltage generating unit 109 and the 2R-corresponding voltage generating unit 110 assumed to have large effects on actual photographing when the "camera shake" is taken into consideration are connected to setting units 112 to 116 (to be described below), by which the voltage values of the two corresponding voltage generating units 109 and 110 can be changed. That is, reference numeral 112 denotes a manual input setting unit for arbitrarily changing and setting the voltage values generated by the 1R- and 2R-corresponding voltage generating units 109 and 110 in accordance with the will of a photographer.

Similarly, reference numeral 113 denotes a focal length-corresponding voltage setting unit for changing and setting the voltage value generated by the 2R-corresponding voltage generating unit 10 on the basis of focal length information of a photographic lens; and 114, a shutter speed-corresponding voltage setting unit for changing and setting the voltage value generated by the 2R-corresponding voltage generating unit 110 on the basis of the shutter speed determined by the exposure conditions before photographing; 115, a shake amount-corresponding voltage setting unit for detecting the shake of a camera by a known shake detecting means and changing and setting the voltage value generated by the 2R-corresponding voltage generating unit 110 in accordance with the detected shake amount; and 116, a continuous photographing-corresponding voltage setting unit for changing and setting the voltage values of the two voltage generating units 109 and 110 when the photographing mode represents continuous photographing (continuous mode).

Reference numeral 117 denotes a notification signal generating unit for generating a notification signal on the basis of the comparison result from the comparing unit 56. A light-emitting diode (LED) driving unit 118 and a sound generator driving unit 119 are connected to the notification signal generating unit 117 to drive an LED (light-emitting diode) 120 and a sound generator 121, respectively, thereby notifying the comparison result from the comparing unit 56 by using these two means. The comparing unit 56 is connected to a photometering start signal generating unit 122, a distance measurement start signal generating unit 123, and a shutter control signal generating unit 124, respectively, for performing operations required for the camera main body 59 upon receiving the comparison results. These units correspond to the control unit 57 described above.

As the release operating unit 51, the arrangement as shown in FIG. 5 which operates as shown in FIG. 6A can be used. In this embodiment, however, neither the voltage $E_3$ corresponding to the third release switch nor the pressure $P_3$ corresponding to the voltage shown in FIG. 6A are used.

On the basis of the above description, the function of the arrangement shown in FIG. 10 will be described below. First, as described above with reference to FIGS. 5 and 6A, a voltage is generated by the pressure-voltage converting unit 34 of the release operating unit 51 in substantially correspondence with the depression of the release button 32 and supplied to the comparing unit 56 via the voltage converting unit 51A. The comparing unit 56 also receives the voltage values corresponding to the operation timings required for the respective operations of the camera main body 59, as described above. These voltage values are generated by the respective voltage generating units 109, 110, and 111 shown in FIG. 10.

The 1R-corresponding voltage generating unit 109 generates a voltage value corresponding to so-called 1R. For example, the unit 109 determines the start timings of the start of display, the photometering operation, and the distance measuring operation required in the camera main body 59. Assume that the voltage output from the release operating unit 51 is $E_P$ and the voltage value generated by the 1R-corresponding voltage generating unit 109 is $E_1$. If the comparing unit 56 determines $E_P \geq E_1$, it determines so-called 1R of a camera. Therefore, the comparing unit 56 outputs the start signals for the start of display, the photometering operation, and the distance measuring operation required for the operations of the camera main body 59. These start signals are generated by the photometering start signal generating unit 122 and the distance measurement start signal generating unit 123.

If the comparing unit 56 determines $E_P < E_1$, a voltage corresponding to 1R is not obtained, i.e., a pressure corresponding to 1R is not applied on the release button 32. Therefore, the comparing unit 56 determines that the 1R state is not set and does not perform any of the start of display, the photometering operation, and the distance measuring operation in the camera main body 59.

The 2R-corresponding voltage generating unit 110 generates a voltage value corresponding to so-called 2R (i.e., a photographing enable state). For example, the unit 110 determines the timings of the start of shutter front curtain running and the start of shutter blade operation. Assume that the voltage output from the release operating unit 51 is $E_P$ and the voltage value generated by the 2R-corresponding voltage generating unit 110 is $E_2$. If the comparing unit 56 determines $E_P \geq E_2$, it determines so-called 2R of a camera. Therefore, the comparing unit 56 generates the operation start signal for the mirror and the shutter required for the operations of the camera main body 59. This signal is actually generated by the shutter control signal generating unit 124. If the comparing unit 56 determines $E_P < E_2$, the camera main body 59 does not start its operations as is the case with 1R.

The operation limit-corresponding voltage generating unit 111 normally performs pressure-voltage conversion because the pressure-voltage converting unit 34 shown in FIG. 5 is used. When an excessive pressure is applied on the pressure-voltage converting unit 34, although an output voltage to be extracted is a problem, there arises another problem in that the member itself, i.e., a portion of the release button 32 is destroyed. For this reason, the voltage value related to the operation limit of the pressure-voltage converting unit 34 is set in the operation limit-corresponding voltage generating unit 111 to solve the above problem. Assume that the voltage output from the release operating unit 51 is $E_P$ and the voltage value generated by the operation limit-corresponding voltage generating unit 111 is $E_L$. If the comparing unit 56 determines $E_P \geq E_L$, application of an unnecessarily high pressure on the release button 32, more specifically, the pressure-voltage converting unit 34 is inhibited. In order to notify a photographer of this inhibition, the LED 20 and the sound generator 21 are used.

If the comparing unit 56 determines $E_P \geq E_L$, a locking member 37 may be used to mechanically limit the depression of the release button 32, as shown in FIG. 11. In this case, a depression inhibit and release signal generating unit 125 indicated by a broken line in FIG. 10 generates a release button depression inhibit signal. This signal is supplied to a locking member driving unit 38 (FIG. 11) provided in the release operating unit 51 and generally constituted by an actuator to generate a driving force. As a result, the locking member 37 is driven. As shown in FIG. 11, the locking member 37 is located to be sandwiched between the release button 32 and the pressure-voltage converting unit 34, thereby mechanically limiting the depression of the release button 32.

When the depression force applied on the pressure-voltage converting unit 34 is reduced and $E_P < E_L$, is determined, the locking member driving unit 38 operates such that the locking member 37 is removed from a gap between the release button 32 and the pressure-voltage converting unit, and the depression inhibit and release signal generating unit 125 generates a release signal for releasing the release button depression inhibition for this purpose. As a result, depression of the release button 32 is enabled. Note that the above mechanism can be omitted by providing a stopper which abuts against the release button 32.

A change in set contents of the 1R-corresponding voltage generating unit 109 and the 2R-corresponding voltage generating unit 110 for generating the voltage values corresponding to the operation timings of the respective operations of the camera main body 59 will be described below. This change is performed by adjusting the operations timings of 1R and 2R of the camera in accordance with arbitrary setting of a photographer or photographing conditions.

The manual input setting unit 112 shown in FIG. 10 will be described. The manual input setting unit 112 is a means for changing, e.g., the voltages $E_1$ and $E_2$ shown in FIG. 6A into voltages $E_1$ and $E_2$ shown in FIG. 12. For this purpose, a button 45, arranged on the upper portion of the camera main body 51 as shown in FIG. 11, for switching the current mode to a "release timing adjusting mode" is operated, and a select button for telephoto-wide angle (T-W) for automatic zooming, a ± operation button for setting the shutter speed and the aperture value, and a ± operation button for exposure compensation, provided in a predetermined portion of the camera main body 51 (none of which are shown), are used to adjust and set the release timing. FIG. 12 shows examples of set possible ranges of the voltages $E_1$ and $E_2$, within which the voltages $E_1$ and $E_2$ can be freely set.

The focal length-corresponding voltage setting unit 113 will be described below. Although this unit 11 operates similarly to the manual input setting unit 112 described above, it does not change the voltage value generated by the 2R-corresponding voltage generating unit 110 in accordance with arbitrary setting of a photographer but automatically changes the 2R-corresponding generated voltage value on the basis of focal length information of the lens at the moment. That is, it is well known that the occurrence frequency and the magnitude of an image shake caused by a camera shake depend on the focal length of a lens used. Therefore, assuming that the magnitude of a camera shake remains unchanged, it is obvious that an image shake has a larger magnitude as the focal length of a lens used is increased. On the basis of this principle, the focal length-corresponding voltage setting unit 113 changes the voltage $E_1$ shown in FIG. 12.

For example, when the local length is large, an image shake caused by a camera shake easily occurs, and its influence is large. Therefore, in order to minimize a variation upon shutter release, the generated voltage value of the 2R-corresponding voltage generating unit 110 is changed so that the voltage $E_2$ becomes smaller than a normal voltage value, i.e., the 2R operation is performed even if a depression pressure [kg/cm$^2$] applied on the release button 32 is small.

The shutter speed-corresponding voltage setting unit 114 will be described below. The basic principle of this unit 114 is the same as that of the focal-length corresponding voltage setting unit 113. That is, the shutter speed-corresponding voltage setting unit 114 automatically changes the 2R-corresponding generated voltage value on the basis of the shutter speed determined by exposure conditions at the moment. It is well known that the occurrence frequency and the magnitude of an image shake caused by a camera shake largely depend on the shutter speed. Therefore, if the camera shake continuously occurs, it is assumed that the image shake caused by the camera shake is halved as the shutter speed is increased by one step. On the basis of this principle, the shutter speed-corresponding voltage setting unit 114 changes the voltage $E_2$ in FIG. 12 in correspondence with the current shutter speed.

For example, when the shutter speed is low, an image shake caused by a camera shake easily occurs, and its influence is large. Therefore, in order to minimize a vibration upon shutter release, the generated voltage value of the 2R-corresponding voltage generating unit 110 is changed so that the voltage $E_2$ becomes smaller than a normal voltage value, i.e., the 2R operation is performed even if the depression force P [kg/cm$^2$] applied on the release button 32 is small.

The shake amount-corresponding voltage setting unit 115 will be described below. The basic principle of this unit 115 is the same as those of the focal length-corresponding voltage setting unit 113 and the shutter speed-corresponding voltage setting unit 114 described above. That is, a current shake state of a camera is detected by a well-known camera shake detecting means to automatically change the 2R-corresponding generated voltage value. That is, the shake amount-corresponding voltage setting unit 115 changes the voltage $E_2$ shown in FIG. 12 in accordance with the magnitude of the camera shake. When the shake is large, the generated voltage value of the 2R-corresponding voltage generating unit 110 is changed so that the $E_2$ becomes smaller than a normal voltage value, i.e., the 2R operation is performed even if the depression force P [kg/cm²] applied on the release button 32 is small.

Changes in generated voltage value of the 2R-corresponding voltage generating unit 110 based on the focal length information, the shutter speed information, and the shake information will be described below. Referring to FIG. 12, a voltage corresponding to a voltage $P_2$ [kg/cm²] is $E_2$ [V], and $P_2$ is changed by shifting (changing) $E_2$. $E_2$ is defined as follows:

$$E_2 = E_2' + K_2 \cdot (F+S) \, [V] \qquad (1)$$

where $E_2'$ is a reference voltage value corresponding to 2R and normalized beforehand. However, $E_2'$ can be arbitrarily set by the manual input setting unit 112. $K_2$ is a coefficient for determining the shift in voltage value. When this coefficient is large, the voltage $E_2$ corresponding to 2R is largely shifted. $K_2$ is a value larger than 0. In order not to determine the operation timings of the camera on the basis of the focal length information and the shutter speed information (i.e., in order not to shift the operation timings), the value of $K_2$ is set to be 0 (zero). As a result, as is apparent from equation (1), the generated voltage value of the 2R-corresponding voltage generating unit 110 becomes $E_2 = E_2'$, and no shifting is performed for the operation timings. This coefficient $K_2$ can be set by the manual input setting unit 112.

Two coefficients S and F will be described below with reference to the following Tables 1 and 2.

TABLE 1

| Focal length: f [mm] | Shift amount: F |
|---|---|
| 24 | +2 |
| 35 | +1 |
| 50 | ±0 |
| 105 | −1 |
| 150 | −2 |
| 200 | −4 |

TABLE 2

| Shutter speed [SEC] | Shift amount: F |
|---|---|
| 1/f + 3 steps | +1 |
| 1/f + 2 steps | +0.5 |
| 1/f + 1 step | ±0 |
| 1/f | ±0 |
| 1/f − 1 step | −1 |
| 1/f − 2 steps | −2 |
| 1/f − 3 steps | −4 |

Table 1 shows an example of a shift amount F of an operation timing based on a focal length f, and Table 2 shows an example of a shift amount S of an operation timing based on the shutter speed. As is apparent from equation (1), an optimal shift amount is added to the reference voltage value corresponding to 2R in proportion to the coefficient $K_2$ to determine the final camera operation timing $E_2(P_2)$. The shift amount F is determined in correspondence with the focal length f [mm] in Table 1, and the shift amount S is determined in accordance with the shutter speed [sec]. For example, assume that a shutter speed for proper exposure is 1/15 [sec] when photographing is to be performed using a standard lens of focal length f=50 [mm]. In this case, the shift amount F is 0 (zero) from Table 1, and the shift amount S is −2 from Table 2. Therefore, equation (1) is rewritten as follows:

$$E_2 = E_2' - 2 \cdot K_2 \, [V] \qquad (2)$$

That is, $E_2$ becomes smaller than $E_2'$ because $2 \cdot K_2$ is subtracted therefrom, and it corresponds to $P_2$ as described above. Therefore, the 2R state can be recognized even if depression on the release operating unit (1) is smaller than normal depression. In addition, by rewriting equation (1) as follows, shifting of the operation timing can be performed on the basis of only the focal length information or the shutter speed information:

$$E_2 = E_2' + K_A \cdot F + K_B \cdot S \, [V] \qquad (3)$$

where $K_A$ and $K_B$ are coefficients with respect to the focal length information and the shutter speed information, respectively, which are independent from each other and can be set by the manual input setting unit 112.

The voltage value $E_2$ can be changed in accordance with an actual shake amount at the moment. In this case, a limit value (first reference value) of the shake amount is set beforehand, and $Q(X) = Q(1)$ is determined when the first reference value is exceeded. When the shake amount is large to exceed a predetermined second reference value, $Q(X) = Q(2)$ is determined. Similarly, a third reference value, a fourth reference value . . . are set, and $Q(3)$, $Q(4)$, . . . are determined when the respective reference values are exceeded. As a result, $E_2$ is given by the following equation in accordance with the actual shake amount:

$$E_2 = E_2' + Q(X) \qquad (4)$$

where Q is a predetermined function and $E_2'$ is the same as described above, i.e., the reference voltage value corresponding to 2R. The 2R necessary depression force $P_2$ is changed as $E_2$ is changed.

The continuous photographing-corresponding voltage setting unit 116 will be described below. This unit operates similarly to the respective corresponding voltage setting units 112 to 115 described above. In continuous photographing, however, unlike in normal photographing, a camera operation cycle of photometering→distance measurement→photographing→photometering→. . . is repeatedly performed with the release button kept depressed. Therefore, in the continuous photographing, the depression force applied on the release button 32 must be substantially constant in order to prevent an image shake caused by a camera shake.

Assuming that the continuous photographing is to be performed, comparison of the voltage values performed by the comparing unit 56 described above is basically performed once. Also, assume that only whether the continuous photographing is to be performed is to be taken into consideration. In this case, if the continuous photographing is to be performed, the above cycle of photometering→distance measurement→photographing→photometering→. . . is repeatedly performed. If the continuous photographing is not to be performed, i.e., if no photographing is to be performed, this cycle is naturally unnecessary. Therefore, in the continuous photographing mode, the voltage values $E_1$ and $E_2$ are preferably set closer to each other than in a normal case so as not to apply a load on a photographer upon shutter release.

That is, the generated voltage value of the 2R-corresponding voltage generating unit 110 is changed such that 1R and 2R can be discriminated by close values or the same value of the depression force P [kg/cm$^2$] applied on the release button 32. For example, when $E_1$ and $E_2$ are set at the same voltage value, the pressure values $P_1$ and $P_2$ become equal to each other. Therefore, as described above, the comparing unit 56 determines only whether the continuous photographing is to be performed or not. Therefore, as shown in a graph of FIG. 13, $E_1$ and $E_2$ become $E_R$, and $P_1$ and $P_2$ become $P_R$ accordingly. As a result, comparison between the voltage values can be performed by one point by the above-mentioned method.

Figure 13:
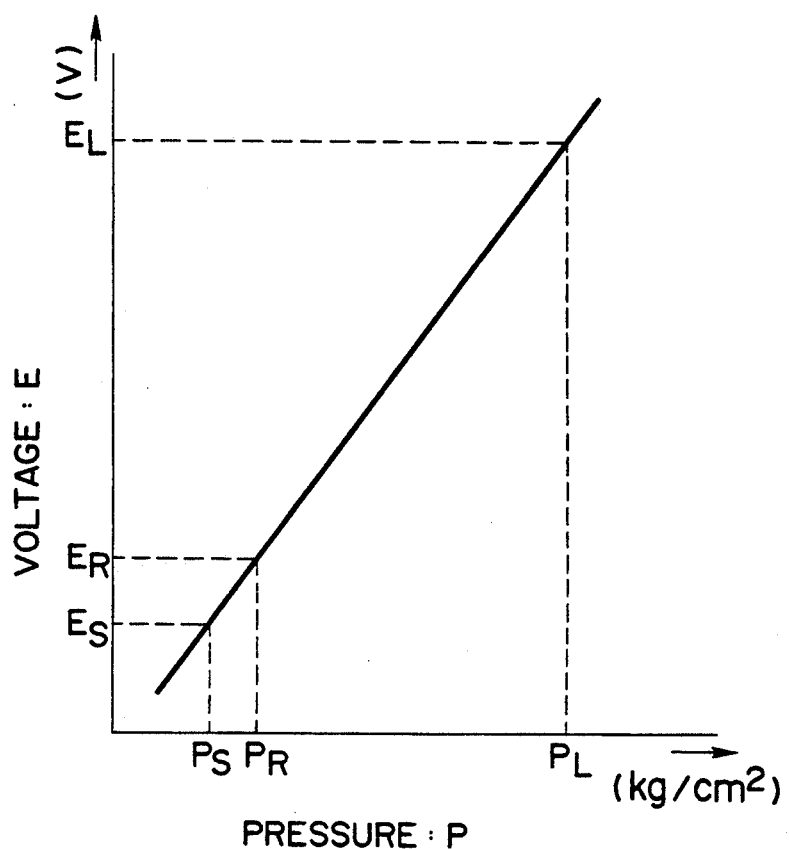

In connection with the depression of the release button 32, $P_R$ is located close to $P_S$ in FIG. 13. However, the present invention is not limited to the above embodiment, but the generated voltage values of the two voltage generating units 109 and 110 can be set such that $P_R$ is located close to $P_L$ in accordance with the taste or skill of a photographer.

Note that the voltage $E_S$ corresponding to the pressure $P_S$ and the voltage $E_L$ corresponding to the pressure $P_L$ are respectively the minimum and maximum voltages which can be discriminated.

The notification signal generating unit 117, the LED driving unit 118, and the sound generator driving unit 119 shown in FIG. 10 will be described below. As has been described above, this embodiment is characterized by using the pressure-voltage converting unit for generating a voltage in accordance with depression on the release operating unit 51. For this reason, an operation timing with respect to the release operation can be changed in accordance with the taste or skill of a photographer and the photographing conditions. However, a variation may be produced in the operation timing with respect to the release operation in each photographing. Therefore, the above system originally performed to prevent the camera shake alone may be difficult to use.

Therefore, some kind of notification must be given to a photographer in correspondence with the operation timing. In FIG. 10, the comparing unit 56 compares the voltage from the release operating unit 51 for generating a voltage corresponding to depression of the release operation with the voltage values generated by the respective voltage generating units 109 to 111 for generating voltage values corresponding to the respective operation timings of the camera, and the operation timings required for the respective operations of the camera main body 59 are determined in accordance with the comparison result, as described above. FIG. 6A shows this relationship in the form of a graph (note that in this embodiment, voltage $E_3$−pressure $P_3$ is not taken into consideration as described above). Therefore, a notification for discrimination is performed at the respective pressure points $P_1$, $P_2$, and $P_L$. This notification can be performed by using the output signal from the comparing unit 56. In this case, a photographer may be notified by illumination of the LED 120, an alarm sound generated by the sound generator 121, or the both. For this purpose, the LED driving unit 118 and the sound generator driving unit 119 are operated.

For example, when the depression force of the release button 32 is $P_1$, the 1R state, i.e., the start of an input from the driving system power source of the camera, the photometering operation, or the start of display of photographing data caused by the photometering operation is assumed. This state can be notified by displaying the photographing data (e.g., the shutter speed and the aperture value) obtained by photometering.

When the distance measuring operation is started, a photographer is notified of this information by an alarm sound. When the depression force of the release button 32 is $P_L$, it is assumed that the depression force is very close to the limit (withstand voltage) of the pressure-voltage conversion performed by the pressure-voltage converting unit 34. Therefore, notification is performed for a photographer by an alarm sound so that the depression force on the release button 32 is not increased to be larger than the present value. Since this notification is different in character from normal notification, the alarm sound may be continuously generated or information in a certain portion of the finder of the camera may be turned on/off, for example, to perform the notification so that a photographer clearly recognizes it.

When the depression force of the release button is $P_2$, the 2R state of the camera is assumed. Since actual photographing is immediately performed when this state is determined by the comparing unit 56, notification need not be particularly performed. However, in order to prevent a camera shake, a pressure range from $P_1$ to $P_2$ is considered to be important.

Figure 14:
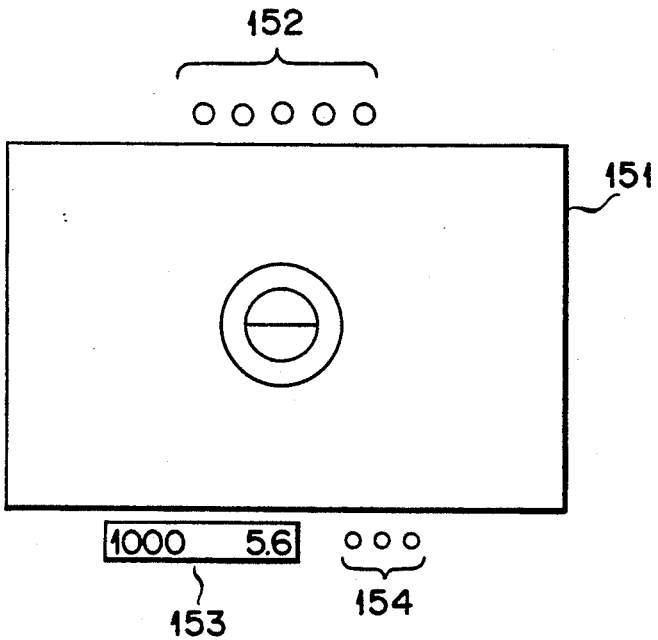
FIG. 14 is a view showing a display example of an operation timing in a finder.

Therefore, a change is given to the display in the finder as shown in FIG. 14. This change is based on the fact that a photographer views a finder from 1R to 2R regardless of whether a camera shake is to be prevented. Therefore, information from 1R to 2R is displayed in the finder. Referring to FIG. 14, reference numeral 151 denotes a finder frame; 152, an LED (light-emitting diode) array for notifying the release depression state from 1R to 2R; 153, a first photographing data display unit for displaying photographing data (the shutter speed and an aperture value); and 154, a second photographing data display unit for notifying information related to photographing such as exposure alarming, an in-focus or out-of-focus state in a distance measuring operation, a charge completion of an electronic flash.

When the 1R state of the camera is determined, the distance measuring operation is started as described above, and the camera waits for the 2R state. At this time, the operation timing with respect to the release operation can be changed in accordance with the photographing conditions, as described above. However, since this change may cause a variation in the operation timing with respect to the release operation, a timing from 1R to 2R which is important to prevent a camera shake is difficult to be recognized by a photographer.

Therefore, the timing from 1R to 2R is notified to a photographer by turning on the LED array 152 in FIG. 14. More specifically, after 1R is finished, LEDs of the LED array 152 are sequentially turned on upon depression of the release button. A reference voltage value for determining whether the LED is to be turned on is set such that the 2R state is set after all of N (five in FIG. 14) LEDs are turned on. For example, assuming that the LEDs of the LED array 152 are $L_1$, $L_2$, $L_3$, . . . , $L_n$ from the left, a reference voltage value for determining whether $L_n$ is to be turned on is determined by the following equation:

$$E(L_n) = E_1 + (E_2 - E_1) \cdot n/N \ [V] \qquad (5)$$

where $E_1$ and $E_2$ are voltage values corresponding to $P_1$ and $P_2$ as described above, N is the total number of LEDs in the LED array 52, and n is the nth LED. The $E(L_n)$ is stored in a voltage storage means (not shown) and compared with the voltage value corresponding to the depression force on the release button 32, i.e., the voltage value output from the release operating unit 51. As a result, a photographer can recognize the timing from 1R to 2R which is considered to be important to prevent a camera shake. In a similar method, an alarm sound may be changed stepwise.

Figure 15:
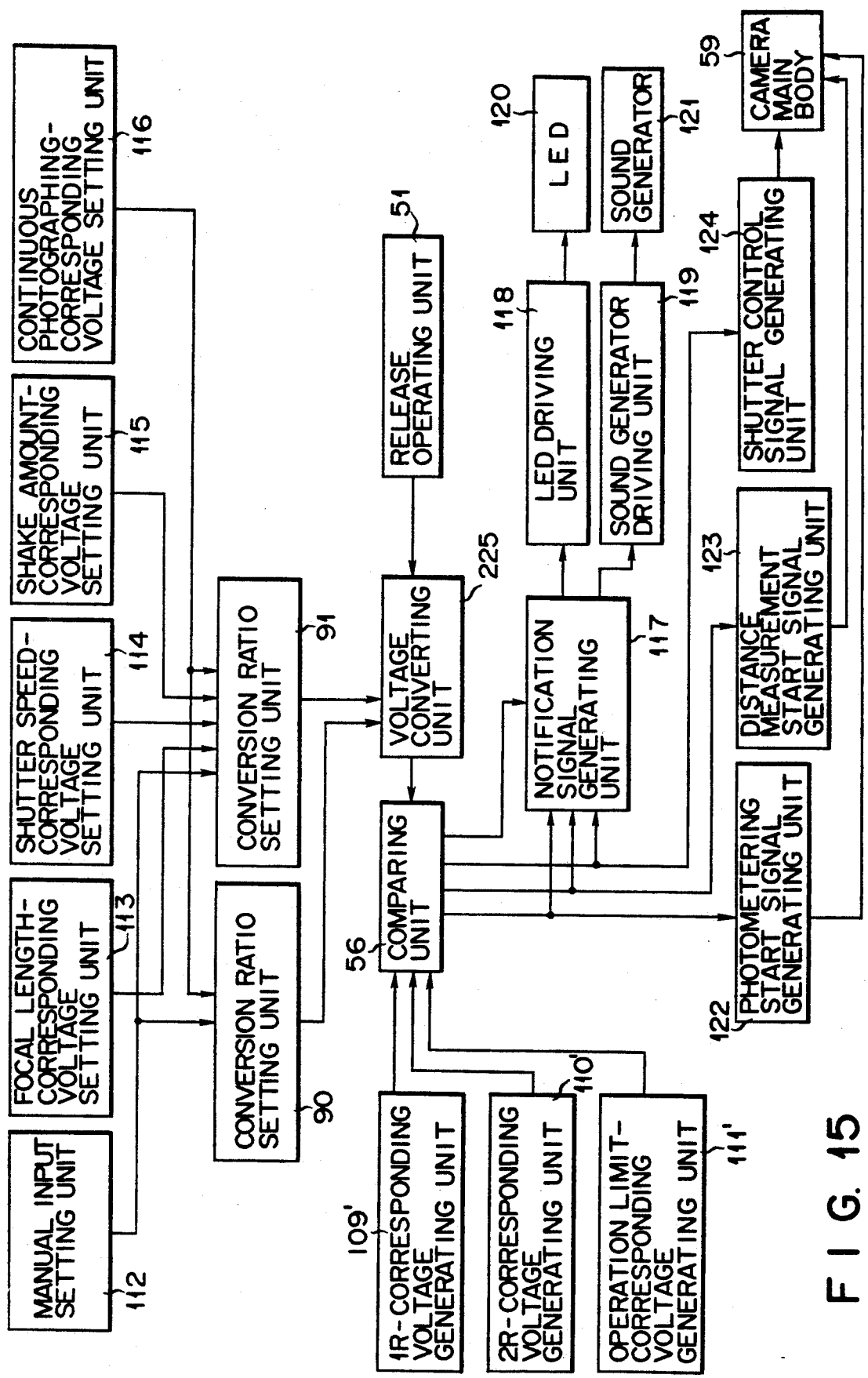
FIG. 15 is a block diagram showing an arrangement of a camera according to the third embodiment of the present invention.

The third embodiment of the present invention will be described below. FIG. 15 is a block diagram showing an arrangement of a camera according to the third embodiment of the present invention. The same reference numerals as in FIG. 10 denote the same parts in FIG. 15 and a detailed description thereof will be omitted, and only different portions will be described below. Referring to FIG. 15, reference numerals 109', 110', and 111' denote corresponding voltage generating units similar to the units 109, 110, and 111 shown in FIG. 10. Unlike in the above second embodiment, however, each voltage value is not changed but fixed. Reference numeral 225 denotes a voltage converting unit for weighing a voltage signal from a release operating unit 51 on the basis of outputs from conversion ratio setting units 90 and 91 for setting conversion ratios for the 1R-and 2R-corresponding voltages set in the second embodiment.

Only a difference of the function of the arrangement shown in FIG. 15 from that of the second embodiment will be described below. First, a voltage proportional to the depression operation of the release button 32 is obtained from the release operating unit 51 and supplied to the voltage converting unit 225. On the other hand, the conversion ratio setting unit 90 determines a 2R-corresponding voltage $E_2$ on the basis of equation ③ described above, and a necessary $P_2$ is determined accordingly. These values are also supplied to the voltage converting unit 225. For example, assuming that $E_2$ obtained by equation 3 is $XE_2$, if the relationship of the pressure-voltage converting unit is substantially linear or is a one-to-one correspondence, $XP_2$ is determined when $XE_2$ is obtained in FIG. 16.

In this embodiment, the voltage values generated by the respective corresponding voltage generating units 109', 110', and 111' are fixed and do not always satisfy $XE_2 = E_2$. Therefore, 2R cannot be sometimes correctly determined. Referring back to FIG. 16, $XE_2$ is determined by equation ③, and $XP_2$ is determined accordingly, described above. However, since the 2R-corresponding voltage is fixed in the 2R-corresponding voltage generating unit 110', $P_2$, i.e., 2R cannot be determined. In this case, by drawing a line, i.e., changing the pressure-voltage characteristic to obtain $(P_S, E_S) - (XP_2, E_2)$ in FIG. 16, $E_2$ can be determined at $XP_2$ (a point A). Assuming that a conversion coefficient of the pressure-voltage characteristic is G, a normal relationship is given by:

$$E = G \cdot P \, [V] \qquad (6)$$

Figure 16:
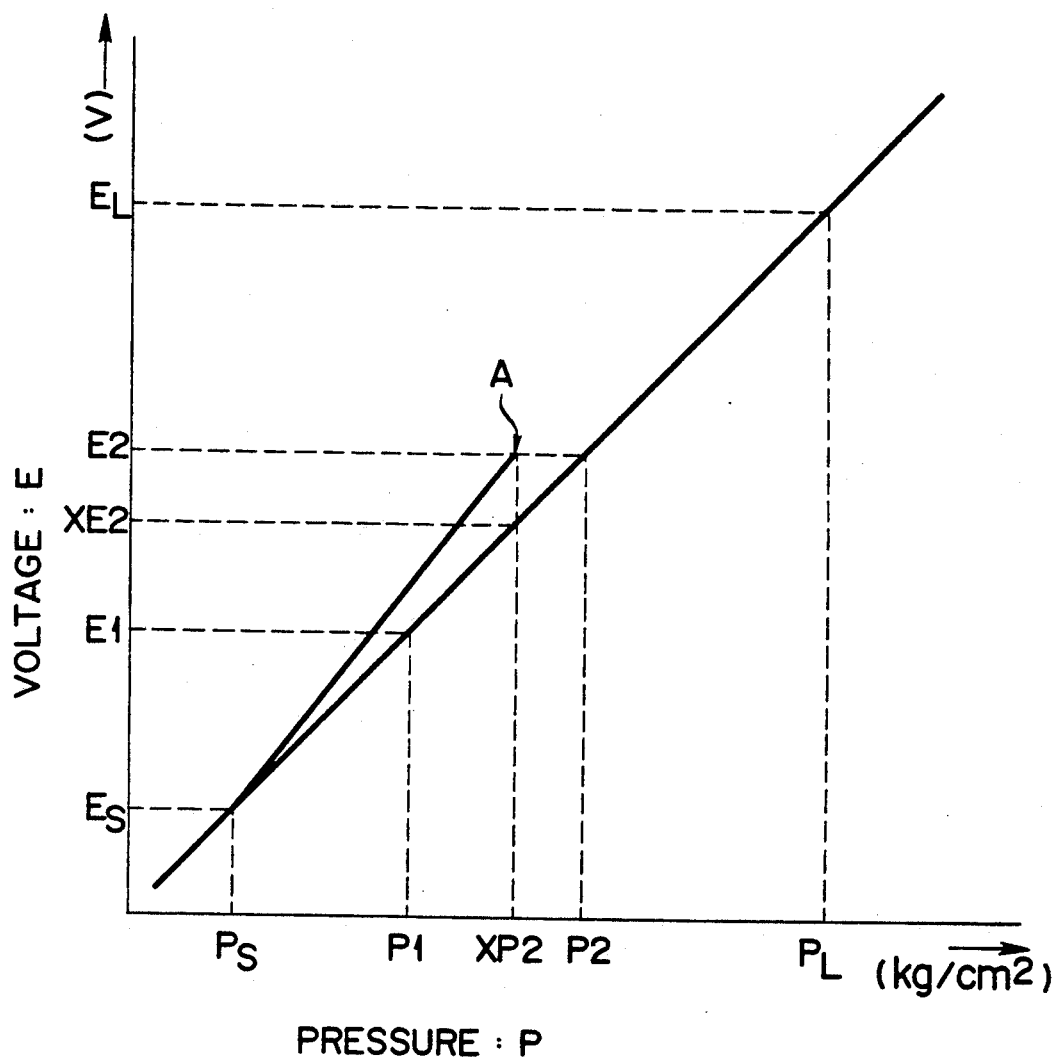
FIG. 16 is a graph showing the pressure-voltage conversion characteristic of a pressure-voltage converting unit according to the third embodiment.

In addition, G between $(P_S, E_S) - (XP_2, E_2)$ shown in FIG. 16 is obtained by the following equation:

$$G = E/P = (E_2 - E_S)/(XP_2 - P_S) \qquad (7)$$

That is, this is the same as to calculate the gradient of a linear function. $XP_2$ is obtained when $XP_2$ with respect to $XE_2$, i.e., the pressure-voltage conversion characteristic is normal, and can be easily calculated from the voltage signal from the release operating unit 51. The voltage converting unit 225 calculates equations ⑥ and ⑦ and performs the operation as shown in FIG. 16, and these results are supplied to the comparing unit 56. The comparing unit 56 compares the voltage values as in the second embodiment to determine the respective operation timings of the camera. Although the voltage values generated by the respective corresponding voltage generating units 109', 110', and 111' are fixed as described above, they can be determined by changing the conversion coefficient G in accordance with the photographing conditions or the taste of a photographer, i.e., changing the weight. As a result, the same effect as in the second embodiment can be obtained.

Note that the arrangement shown in FIG. 7 can also be used as the release operating unit 51 in the second and third embodiments.

Figure 17:
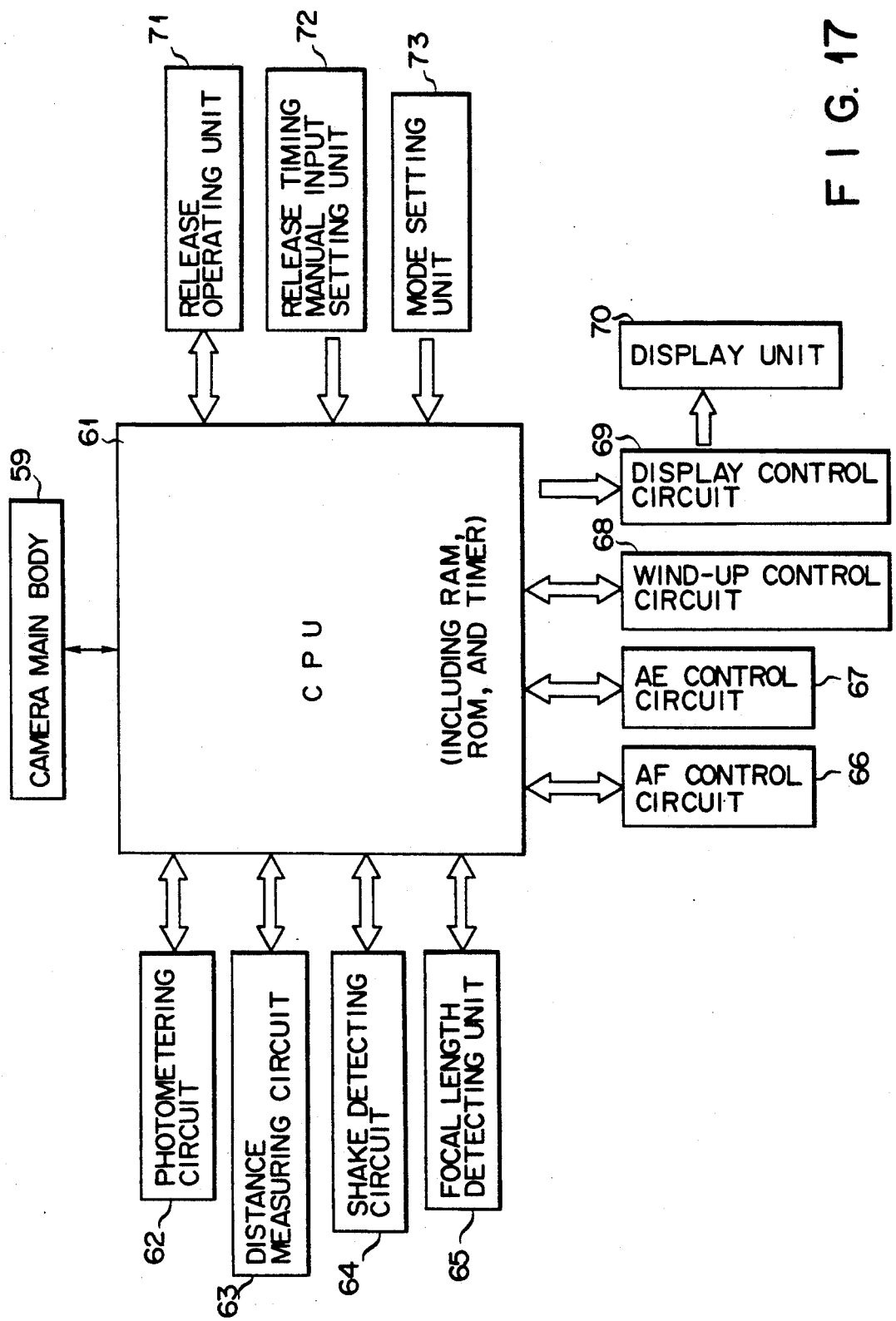
FIG. 17 is block diagram showing the entire arrangement of a camera according to the second and third embodiments of the present invention.

FIG. 17 shows a system arrangement of a camera according to the second and third embodiments of the present invention. Referring to FIG. 17, a CPU 61 for controlling the entire system including the camera main body 59 is connected to detecting circuits such as a photometering circuit 62, a distance measuring circuit 63, a shake detecting circuit 64, and a focal length detecting unit 65, control circuits such as an AF control circuit 66, an automatic exposure (AE) control circuit 67, a film wind-up control circuit 68, and a display control circuit 69 for controlling a display unit 70, and setting units such as a release operating unit 71, a release timing manual input setting unit 72, and a mode setting unit 73.

Figure 18:
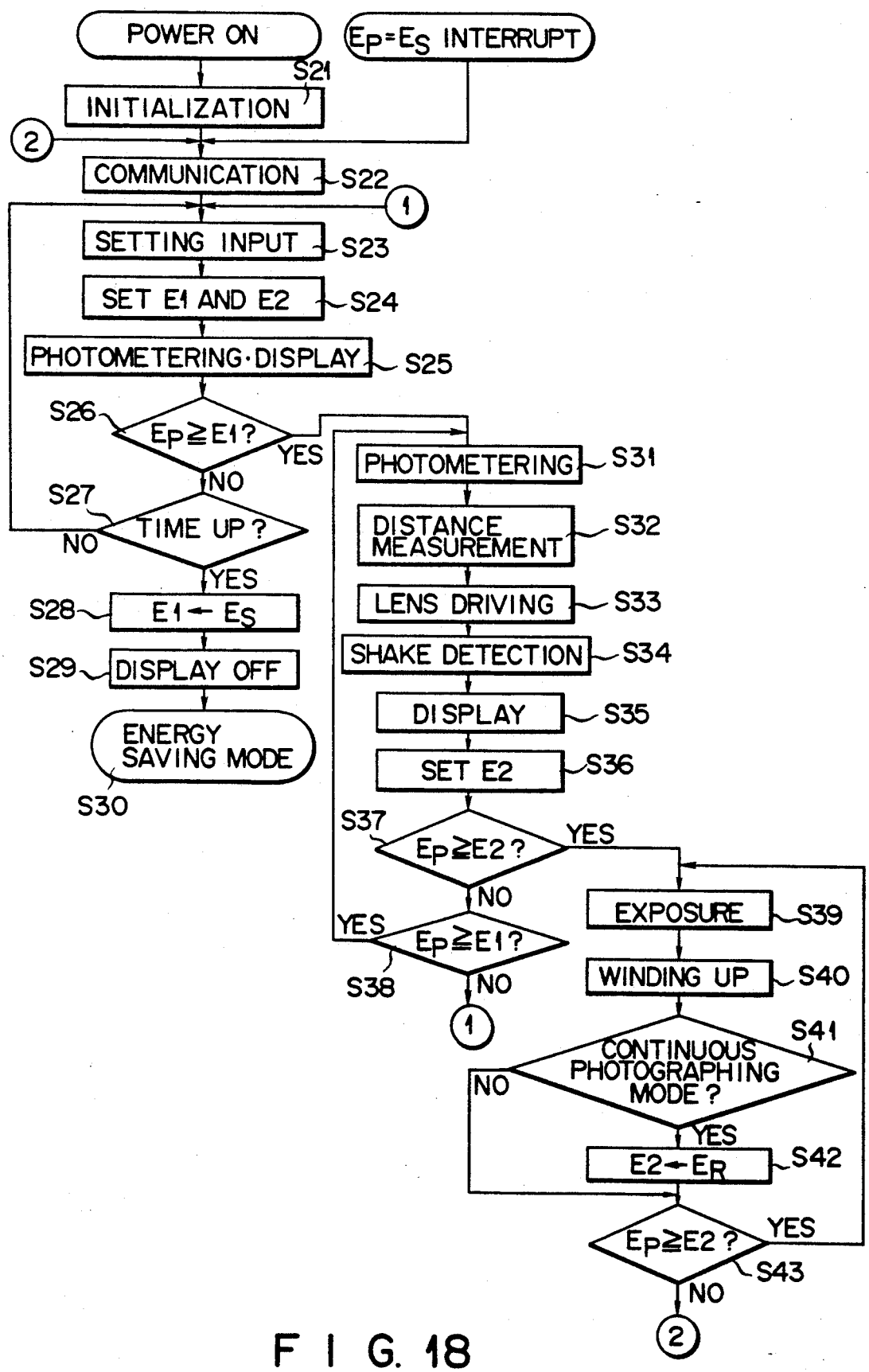
FIG. 18 is a flow chart for explaining an operation of the camera according to the second and third embodiments of the present invention.

An operation of the camera having the above arrangement will be described below with reference to a flow chart shown in FIG. 18. When a power switch is turned on (power ON), the CPU 61 initializes an internal timer, a memory, and the respective mechanical units of the camera main body 59 (step S21). Subsequently, the CPU 61 performs communications with external apparatuses (e.g., various types of external accessories) to receive information about the focal length of a lens and the like (step S22). The CPU 61 receives information from the setting units 72 and 73 to set the photographing mode or the release timings ($E_1$ and $E_2$) (steps S23 and S24). The CPU 61 drives the photometering circuit 62 and the display unit 70 (step S25) and checks the value of $E_P$ to detect whether an operation corresponding to 1R is performed (step S26). If $E_P$ does not reach $E_1$, the CPU 61 checks whether the display timer is timed up (step S27). If the display timer is not timed up, the CPU 61 returns to step S23 and sets $E_1$ at $E_S$ when the timer is timed up (step S28) in order to prevent erroneous release when the display is restarted. Since an object of this processing is to increase the interval between $E_1$ and $E_2$, $E_2$ may be set at a high level. After setting $E_1$, the CPU 61 turns off the display to start an energy saving mode (steps S29 and S30).

If $E_P \geq E_1$ in step S26, the CPU 61 determines that the 1R state is switched on, and drives the circuits 62 to 70 to perform photometering, distance measurement, lens driving, shake detection, and display (steps S31 and S32). Subsequently, as described above, the CPU 61 sets $E_2$ in accordance with the shutter speed or the shake amount obtained from the photometry value (step S36). The CPU 61 checks the value of $E_P$ to detect whether an operation corresponding to 2R is performed (step S37). If $E_P < E_1$ in step S37, the CPU 61 checks whether $E_P \geq E_1$ (step S38). If $E_P < E_1$, i.e., if 1R is also switched off, the CPU 61 returns to step S23. If $E_P \geq E_2$ in step S37, the CPU 61 performs exposure and winding up of one frame (steps S39 and S40) and checks whether the continuous photographing mode is set in the mode setting unit 73 (step S41). If the continuous photographing mode is set, the CPU 61 sets $E_2=E_R$ and checks $E_P$ (steps S42 and S43). If $E_P<E_2$, the CPU 61 returns to step S22 to finish one exposure operation cycle. Note that the CPU 71 sometimes executes interruption of $E_P=E_S$ after initialization in step S21.

According to the arrangement as described above, the release condition (depression force) which is considered as one cause of a camera shake and determined and fixed in individual cameras, and the respective operation timings of a camera determined on the basis of the release condition can be determined in accordance with the taste or skill of a photographer and the photographing conditions (a focal length and a shutter speed). Therefore, individual photographers can take pictures with less image shake regardless of the respective photographing conditions.

The above effects can be obtained because the depression or the stroke of the release button is detected to determine the respective operation timings of the camera. In addition, on the basis of the assumption that an image shake caused by a camera shake is not so increased when the focal length of a lens is short or the shutter speed is high, photographing can be performed under the proper depression conditions without unnecessarily decreasing the required depression force on the release button or shortening its stroke.

As has been described above in detail, according to the second and third embodiments of the present invention, there is provided a camera in which the operation timings of the shutter release can be determined in accordance with the taste or skill of a photographer and the photographing conditions so as to reduce a camera shake.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A control apparatus for a camera, comprising:
   a release operating member to be depressed by a predetermined amount, for causing a camera main body to perform a photographing operation;
   signal generating means for generating a photographing ready signal when said release operating member is depressed by a first amount, a first photographing start signal when said release operating member is depressed up to a second amount exceeding the first amount, and a second photographing start signal when said release operating member is depressed up to a third amount exceeding the second amount;
   measuring means including at least one of a photometering circuit and a distance measuring circuit for measuring a luminance of and a distance to an object to the photographed upon receiving the photograping ready signal from said signal generating means;
   control means for enabling the first photographing start signal from said signal generating means in at least one of a case where the luminance of said object which is measured by said measuring means exceeds a predetermined value and a case where said camera is focusable on said object, and for disabling the first photographing start signal and enabling the second photographing start signal from said signal generating means in at least one of a case where the luminance of said object is less than or equal to the predetermined value and a case where said camera is not focusable on said object where said camera is not focusable on said object; and
   exposing means for operating upon receiving one of the first and second photographing start signals enabled by said control means.

2. An apparatus according to claim 1, wherein said signal generating means comprises a plurality of switches arranged in series with each other in a moving region of said release operating member.

3. An apparatus according to claim 1, wherein said signal generating means comprises a pressure-voltage converting member arranged at a position where said pressure-voltage converting member is applied with a pressure by said release operating member.

4. An apparatus according to claim 1, wherein said signal generating means comprises a variable resistor having a resistance which changes in accordance with a depression movement of said release operating member.

5. A control apparatus for a camera, comprising:
   a release operating member being movable in a moving process by first, second, and third steps to perform a photographing ready operation and a photographing operation for a camera main body;
   signal generating means for outputting a photographing ready signal in the first step of the moving process of said release operating member, a first photographing signal in the second step of the moving process of said release operating member, and a second photographing signal in the third step of the moving process of said operating member;
   first operating means for receiving the photographing ready signal from said generating means, and for causing the camera main body to perform the photographing ready operation;
   selection control means for selecting one of the first and second photographing signals supplied from said signal generating means, in accordance with photographic condition; and
   second operating means which operates in accordance with a signal output from said selection control means for causing the camera main body to perform the photographing operation.

6. A control apparatus for a camera, comprising:
   a release operating member to be depressed by a predetermined amount, for causing a camera main body to perform a photographing operation;
   signal output means, interlocked with an operation of said release operating member, for outputting a first signal when an operation amount or an operation force of said release operating member reaches a first predetermined value, and a second signal when the operation amount or the operation force reaches a second predetermined value larger than the first predetermined value;
   determining means for detecting a state of an object to be photographed or a state of said camera main body to determine whether proper photographing can be performed; and
   control means for controlling, in accordance with a determination result from said determining means, a photographing operation start timing of said camera main body to respond to the first signal from said signal output means when proper photographing is possible, and to respond to the second signal therefrom when proper photographing is impossible.

7. An apparatus according to claim 6, wherein said determining means determines that proper photographing is impossible when a luminance of the object is low and an exposure time may possibly cause a camera shake.

8. An apparatus according to claim 6, wherein said determining means determines that proper photographing is impossible when a focus adjusting device of said camera main body outputs a signal indicating an out-of-focus state.

9. An apparatus according to claim 6, wherein said determining means determines that proper photographing is impossible when said camera main body is shaken beyond an allowable range.

10. A release signal output apparatus for a camera, comprising:
- a release operating member to be depressed by a predetermined amount, for causing a camera main body to perform a photographing operation;
- means for detecting an operation amount or an operation force of said release operating member and generating an output when the operation amount or the operation force reaches a predetermined value;
- state detecting means for detecting that proper photographing is impossible in accordance with a state of an object to be photographed or a state of said camera main body; and
- means for changing the predetermined value of said output generating means to a value corresponding to a larger operation amount or a larger operation force of said release operating member when said state detecting means detects that proper photographing is impossible.

11. An apparatus according to claim 10, wherein said state detecting means outputs a detection signal when a luminance of the object is low and an exposure time may possibly cause a camera shake.

12. An apparatus according to claim 10, wherein said state detecting means outputs a detection signal when said camera main body is in an out-of-focus state.

13. An apparatus according to claim 10, wherein said state detecting means outputs a detection signal when a vibration of said camera main body is large and an influence on photographing exceeds an allowable range.

14. A control apparatus for a camera, comprising:
- a release operating member to be depressed, for causing a camera main body to perform a photographing operation;
- signal output means for generating an electrical signal in accordance with a depression force on said release operating member;
- first release voltage generating means for outputting a first predetermined voltage level;
- second release voltage generating means for outputting a second voltage level different from the first voltage level;
- comparing means for sequentially comparing an output from said signal output means with outputs from said first and second release voltage generating means in accordance with the depression of said release operating member;
- control means including at least one of a distance measuring circuit and a photometering circuit for measuring a distance to and a luminance of an object to be photographed and a shutter operating circuit for operating a shutter, each circuit sequentially operating upon receiving an output from said comparing means; and
- changing means for changing an output from said second release voltage generating means in accordance with photographing conditions of the object.

15. An apparatus according to claim 14, wherein said changing means includes means for changing the output from said second release voltage generating means in accordance with at least one of a luminance of the object, a focal length of a photographic lens, and a photographing mode.

16. A control apparatus for a camera, comprising:
- a release operating member to be depressed, for causing a camera main body to perform a photographing operation;
- electrical signal output means for outputting an electrical signal in accordance with a depression of said release operating member;
- determination level setting means for setting a plurality of determination levels with respect to a output from said electrical signal output means in accordance with start timings of a plurality of operations required for the photographing operation of said camera main body;
- determination level changing means for changing at least one of the plurality determination levels set by said determination level setting means in accordance with photographing conditions;
- comparing means for comparing a determination level set by said determination level setting means with the output from said electrical signal output means and generating an output each time the output from said electrical signal output means exceeds the determination level; and
- means for causing said camera main body to sequentially perform the plurality of operations upon receiving an output from said comparing means.

17. An apparatus according to claim 16, wherein the plurality of determination levels comprises a first level corresponding to at least one of a start of photometering operation and a start of distance measuring operation of said camera main body and a second level corresponding to a start of exposing operation of said camera main body.

18. An apparatus according to claim 16, wherein said determination level changing means changes the determination level in accordance with at least one of a luminance of an object, a focal length of a photographic lens included in said camera main body, and a photographing mode of said camera main body.

19. A release signal output apparatus for a camera, comprising:
- release operating means to be depressed by a predetermined amount, for causing a camera main body to perform a photographing operation;
- means for outputting a continuous electrical signal in accordance with an operation amount or an operation force of said release operating member;
- comparing means for comparing an output from said outputting means with a plurality of predetermined values related to functions of said camera main body and outputting an operation start signal to said camera main body each time the output coincides with the plurality of predetermined values; and changing means for independently changing the plurality of predetermined values in said comparing means.

20. An apparatus according to claim 19, wherein the plurality of predetermined values of said comparing means include at least a value corresponding to a start of photometering operation of said camera main body and a value corresponding to a start of photographing operation thereof.

21. An apparatus according to claim 19, wherein the plurality of predetermined values of said comparing means include at least a value corresponding to a start of distance measuring operation of said camera main body and a value corresponding to a start of photographing operation thereof.

22. An apparatus according to claim 19, wherein the plurality of predetermined values of said comparing means include at least a value corresponding to a start of display operation of said camera main body and a value corresponding to a start of photographing operation thereof.

23. An apparatus according to claim 19, wherein said changing means changes at least one of the plurality of predetermined values in accordance with an exposure time calculated from a luminance of an object to be photographed.

24. An apparatus according to claim 19, wherein said changing means changes at least one of the plurality of predetermined values in accordance with a focal length of a photographic lens included in said camera main body.

25. An apparatus according to claim 19, wherein said changing means changes at least one of the plurality of predetermined values in accordance with a photographing mode of said camera main body.

26. An apparatus according to claim 19, wherein said changing means has predetermined value setting means which can be operated by a photographer, and changes at least one of the plurality predetermined values in accordance with setting of said predetermined value setting means.

27. A camera for performing a photographing operation of a camera main body in accordance with an operation of a release operating member, comprising:
  means for converting an operation amount or an operation force of said release operating member into an electrical signal;
  means for providing a first output when the electrical signal from said converting means reaches a first predetermined value and a second output when said release operating member is further operated to cause the electrical signal to reach a second predetermined value;
  control means for starting at least a photometering operation upon receiving the first output from said providing means and causing said camera main body to start the photographing operation upon receiving the second output; and
  changing means for changing at least one of the first and second predetermined values of said providing means.

28. A camera according to claim 27, wherein said changing means changes at least one of the first and second predetermined values in accordance with an exposure time calculated from a luminance of an object to be photographed.

29. A camera according to claim 27, wherein said changing means changes at least one of the first and second predetermined values in accordance with a focal length of a photographic lens included in said camera main body.

30. A camera according to claim 27, wherein said changing means changes at least one of the first and second predetermined values in accordance with a photographing mode of said camera main body.

31. A camera according to claim 27, wherein said changing means has predetermined value setting means which can be operated by a photographer, and changes at least one of the first and second predetermined value in accordance with setting of said predetermined value setting means.

32. A control apparatus for a camera, comprising:
  a release operating member to be depressed, for causing a camera main body to perform a photographing operation;
  signal output means for generating an electrical signal in accordance with a depression force of said release operating member;
  first release voltage generating means for outputting a first predetermined voltage level;
  second release voltage generating means for outputting a second voltage level different from the first voltage level;
  comparing means for sequentially comparing an output from said signal output means with outputs from said first and second release voltage generating means;
  control means including at least one of a distance measuring circuit and a photometering circuit for measuring a distance to and a luminance of an object to be photographed and a shutter operating circuit for operating a shutter of said camera main body, each circuit sequentially operating upon receiving an output from said comparing means; and
  display means for sequentially changing a display state from a timing at which the output from said signal output means reaches the first voltage level of said first release voltage generating means to a timing at which the output reaches the second voltage level of said second release voltage generating means in accordance with an increase in output from said signal output means.

33. A camera for detecting an operation amount or an operation force of a release operating means, providing a first output when the operation amount or the operation force reaches a first predetermined value and a second output when said release operating member is further operated to cause the operation amount or the operation force to reach a second value, and starting at least a photometering operation upon receiving the first output and a photographing operation upon receiving the second output, comprising:
  changing means for changing the second predetermined value;
  means for setting a value obtained by dividing a value between the first and second predetermined values in accordance with the second predetermined value changed by said changing means; and
  display means for performing display stepwise when the operation amount or the operation force of said release operating member reaches the value divided by said setting means.

34. A control apparatus for a camera, comprising:

a release operating member to be depressed, for causing a camera main body to perform a photographing operation;

converting means for converting a depression force on said release operating member into an electrical signal;

conversion ratio setting means for changing a conversion ratio of said converting means in accordance with photographing conditions;

first release voltage generating means for outputting a first predetermined voltage level;

second release voltage generating means for output a second voltage level different from the first voltage level;

comparing means for sequentially comparing an output from said converting means with outputs from said first and second release voltage generating means in accordance with the depression of said release operating member; and control means including at least one of a distance measuring circuit and a photometering circuit for measuring a distance to and a luminance of an object to be photographed and a shutter operating circuit for operating shutter of said camera main body, each circuit sequentially operating upon receiving an output from said comparing means.

* * * * *